United States Patent [19]
Sudhir

[11] 3,910,302
[45] Oct. 7, 1975

[54] ROLL-OVER VALVE AND VAPOR SEPARATOR

[75] Inventor: Gopinath Sudhir, Dearborn, Mich.

[73] Assignee: Chrysler Corporation, Highland Park, Mich.

[22] Filed: Dec. 14, 1973

[21] Appl. No.: 425,023

[52] U.S. Cl. .............. 137/43; 137/202; 220/85 VS; 220/202
[51] Int. Cl.² ..................... F16K 17/36; F16K 31/22
[58] Field of Search....................... 137/43, 202, 39; 220/85 VS, 202

[56] References Cited
UNITED STATES PATENTS

| | | | |
|---|---|---|---|
| 1,009,044 | 11/1911 | Burgess | 137/202 |
| 1,384,486 | 7/1921 | Riesberg | 137/202 X |
| 3,351,497 | 11/1967 | Lucas | 137/43 X |
| 3,768,498 | 10/1973 | Urban | 137/43 |

FOREIGN PATENTS OR APPLICATIONS

| | | | |
|---|---|---|---|
| 596,192 | 8/1925 | France | 137/202 |
| 211,509 | 7/1909 | Germany | 137/202 |

Primary Examiner—Robert G. Nilson
Attorney, Agent, or Firm—Talburtt & Baldwin

[57] ABSTRACT

An inverted hollow cup-like plunger having a closed top comprising a spherical valve element is supported coaxially and freely movably within an outer inverted cup-like housing secured within the upper portion of an automobile fuel tank. The housing opens upwardly through a circular valve seat into a vapor vent conduit for the tank and is provided with restricted ports near both its upper and lower portions for passage of vapor from the tank into a space between the housing and plunger to complete a vapor flow path from the upper portion of the tank into the vent conduit. When liquid fuel splashes into said space, the fuel will drain back to the tank via the lower restricted ports, in which event the upper restricted ports serve as vacuum breakers to facilitate the drainage. Upon predetermined plunger movement induced by fuel splashing or gravity, the valve element seats at the valve seat and closes the vent opening.

12 Claims, 4 Drawing Figures

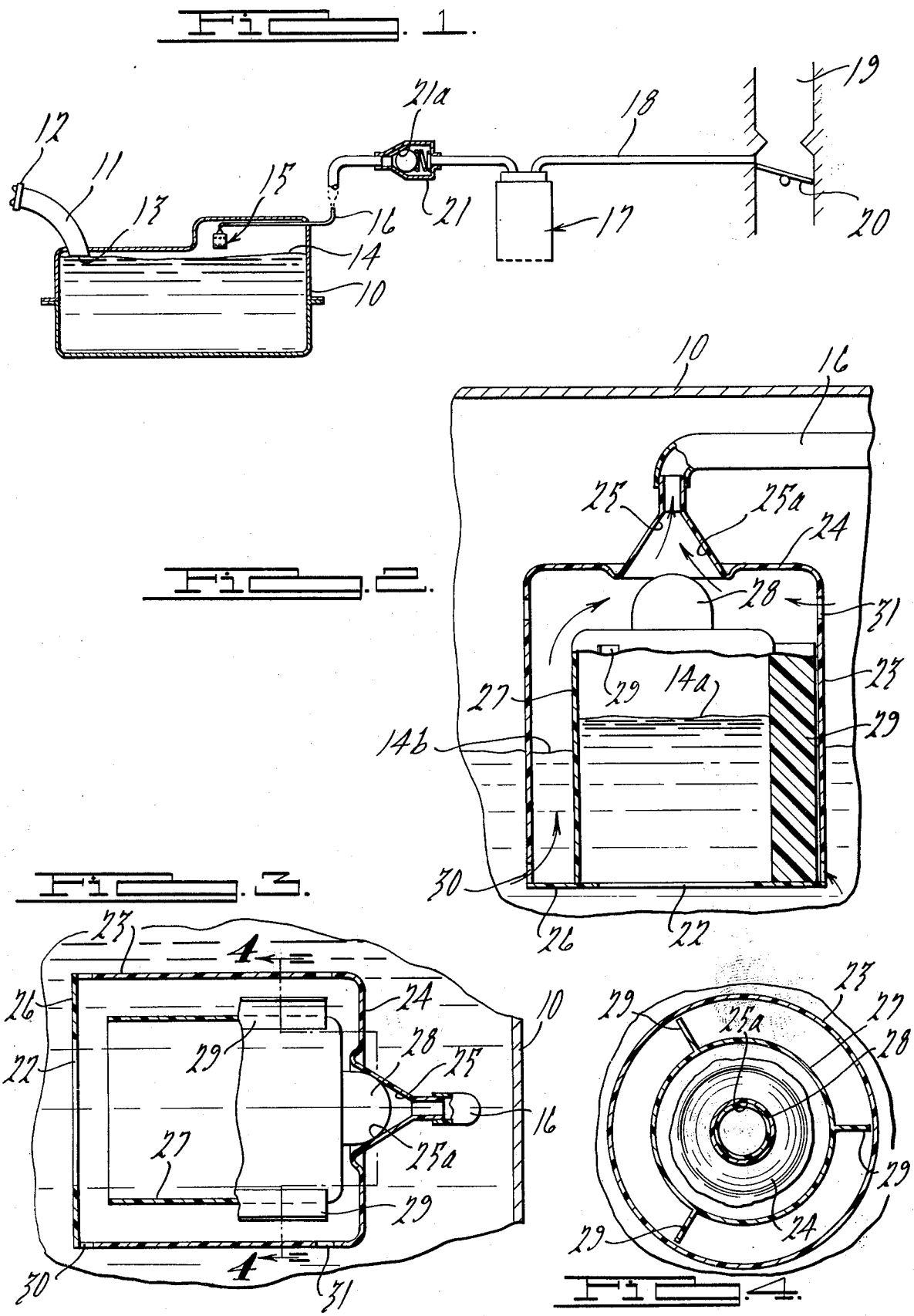

ROLL-OVER VALVE AND VAPOR SEPARATOR

BACKGROUND AND SUMMARY OF THE INVENTION

In order to minimize fuel losses to the atmosphere by evaporation from the gasoline tank and other liquid fuel sources associated with an automobile engine, the fuel vapors are commonly vented to a charcoal canister for adsorption therein when the engine is not operating, and are vented to the engine fuel-air intake manifold when the engine is operating. In order to prevent entrainment of liquid fuel with the fuel vapors, as for example when the automobile is driven along a steep incline or as a result of splashing when the automobile is driven over rough roads, the vent line customarily communicates with the fuel tank at an upper region thereof above the normal fuel level. In addition various types of vapor separators are employed to cooperate with the opening of the vent line or conduit into the fuel tank.

In order to prevent fuel leakage from the fuel tank in the event of an accidental roll-over of the automobile, or when the latter is tilted to an extreme angle, as for example in the event the automobile is run over an embankment or into a ditch, which fuel leakage would then become a fire hazard and hamper rescue operations, it is desirable to provide an emergency or "roll-over" valve in the vent line to close the same and prevent liquid fuel from flowing thereinto from the fuel tank.

An object of the present invention is to provide an improved and highly efficient "roll-over" valve of economical construction that accomplishes both the above-mentioned emergency function and also serves as an effective vapor separator, so that the use of a conventional vapor separator and its consequent expense in addition to a roll-over valve is no longer required.

Other objects of this invention will appear in the following description and appended claims, reference being had to the accompanying drawings forming a part of this specification wherein like reference characters designate corresponding parts in the several views.

FIG. 1 is a schematic view showing an automobile fuel tank and the fuel vapor vent conduit to the adsorption canister.

FIG. 2 is an enlarged mid-sectional view through the "roll-over" valve embodying the present invention.

FIG. 3 is a view similar to FIG. 2, showing the valve in a tilted and closed position.

FIG. 4 is a sectional view through the roll-over valve taken in the direction of the arrows substantially along the broken line 4—4 of FIG. 3.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENT

FIG. 1 shows a typical automobile gasoline fuel tank 10 having a filler spout 11 closed by a removable outer cap 12. The spout 11 opens into an upper location 13 of the tank 10 and determines the normal maximum fuel level 14 in the tank as explained below. Also secured within the tank 10 above the maximum fuel level 14 is the combined vapor separator and roll-over valve 15 of the present invention through which fuel vapor may be vented via vent conduit 16 to the upper end of a charcoal filled canister 17. The latter is open at its opposite lower end to the atmosphere. The upper end of the canister 17 is also connected by conduit 18 to the low pressure of the fuel-air intake manifold 19 of the engine, as for example adjacent or downstream of the leading edge of the throttle valve 20 when the latter is moved from its idle position shown.

A one-way check valve 21 in vent conduit 16 restricts the venting of vapors from the tank 10 until the pressure therein attains a predetermined low value of approximately 8 to 10 inches of water, for example. Thus when a gasoline station nozzle equipped with an automatic pressure operated shut-off valve is inserted into spout 11, the tank 10 may be filled to the level 14. During the filling operation, air and fuel vapors are exhausted from the tank via spout 11. When the fuel level reaches opening 13, the escape of gas via spout 11 is blocked and the tank pressure rises by virtue of the check valve 21, causing the gasoline station nozzle to shut off at the fuel level 14 slightly above the level of opening 13.

The cap 12 is then secured in place to close the tank 10. Diurnal heating of the tank 10 may increase the vapor pressure therein sufficiently to open valve 21 and discharge fuel vapors into canister 17, where the vapors are stored by adsorption if the engine is not operating. When the engine is operating, engine manifold vacuum will purge the canister 17 of previously stored fuel vapor by fresh air flow therethrough via its open lower end and thence through conduit 18 to the intake manifold 19. During this operation, the lower canister opening to atmosphere prevents the low manifold pressure in line 18 from being conducted significantly to line 16.

Check valve 21 is provided with a vapor bleed slot 21a that permits a slow gas or vapor bleed in either direction through valve 21 even when the latter is closed. Thus when the liquid fuel level 14 gradually lowers as fuel is conducted from the tank to the engine during operation, a sub-atmospheric pressure in tank 10 and possible collapse of the latter are avoided.

The operation and function of the structure described thus far may be conventional and are accordingly not discussed in further detail.

Referring to FIGS. 2 and 3, the valve 15 comprises an outer fixed hollow housing suitably secured to the interior of the tank 10 above the fuel level 14. The housing comprises an inverted cup having a cylindrical sidewall 23 and closed at its top 24 except for a central upwardly converging conical opening 25 to the vent line 16. An annular inbent flange 26 of the sidewall 23 supports a coaxial hollow inner plunger 27 comprising an inverted cup having a cylindrical sidewall and upper end closure, the latter having a central spherical valve element 28 adopted to seat within the conical vent opening 25 and thereby close the same upon upward movement of the plunger 27.

The portion of the conical opening 25 at which spherical valve element 28 seats is accordingly a circular valve seat 25a, FIG. 4, whereby a fluid tight seal between seat 25a and element 28 is obtained regardless of any misalignment of the axes of wall 23 and plunger 27. A plurality of axially extending radial fins 29 of the plunger 27 maintain the latter generally coaxially within housing sidewall 23, but allow freedom of movement of plunger 27 axially by virtue of approximately a thirty-second of an inch clearance between the radially outer edges of the fins 29 and the sidewall 23.

During usual operation, the cup or plunger 27 rests on flange 26 and fuel vapors or air freely flow through one or more restricted ports 30 in the lower edge of wall 23, or through similar restricted ports 31 near the upper edge of wall 23, then into the annular vapor passage space between the wall 23 and cup 27 and into vent line 16 to the canister 17 via conical opening 25 when the pressure in tank 10 exceeds the small amount required to open check valve 21.

The lower end of the plunger or inverted cup 27 is completely open within the annular flange 26, which has an inner diameter 22 only slightly less than the diameter of the cylindrical wall of cup 27 so as to support the latter at any position out of coaxial alignment within wall 23 that is permitted by the fins 29. Thus in the event of sloshing of liquid fuel within tank 10, as for example during rapid acceleration, stopping, or turning of the automobile, the liquid level within cup 27 might rise to the level 14a. Vapors trapped above the fuel level 14a will cause the cup 27 to float upwardly and seat the spherical valve element 28 at the circular valve seat 25a within the conical opening 25 and close the same. By virtue of the spherical surface of the element 28, the latter will effect a fluid tight seal when seated within the conical opening 25 regardless of the relative angle between the axes of the housing wall 23 and cup 27. Simultaneously a limited amount of liquid fuel may splash in through restricted ports 30 and 31, as indicated at 14b, but by virtue of the restrictions of the latter ports, the amount of such fuel will be nominal. Passage of such fuel into vent line 16 will be prevented by the element 28 seated within opening 25 as aforesaid. Also the flange 26 shields the lower openings 30 from direct upward splashing, so that the entrainment of liquid fuel into the annular space between wall 23 and cup 27 is minimized.

When the splashing subsides, the liquid fuel within cup 27 will drain rapidly back through the large opening 22 into the tank 10, permitting the plunger 27 to return by gravity to its lower position supported on flange 26, FIG. 1, unless the automobile is tilted to an extreme position, as described below. The conical opening will ordinarily be free to conduct vapor into vent line 16 from the tank 10 via the upper ports 31. The latter also enables the fuel indicated at 14b to drain readily through the lower ports 30 and return to the lower portions of the tank 10. Without the provision of the ports 31, drainage of fuel through ports 30 would be retarded because of the reduced pressure above the fuel level 14b that would otherwise result as soon as the volume of liquid fuel between wall 23 and cup 27 is reduced by such drainage. The ports 30 are immediately above flange 26 to prevent any entrapment of liquid fuel in the annular vapor passage between cup 27 and wall 23.

In the event the automobile is rolled over on its side for example, FIG. 3, the opening 25 will be closed by the valve element 28 similarly as described above. In such an event, liquid fuel will flow comparatively slowly through the small openings 30 and 31 and into the annular space between wall 23 and cup 27, but will flow rapidly through the unrestricted bottom opening 22 into the cup 27 and force the latter toward the opening 25 and cause the element 28 to seat at 25a. Once the valve element 28 seats at the valve seat 25a to prevent passage of vapor into vent conduit 16, the differential pressure acting on the cup 27 will hold the latter at the vent closing position of FIG. 3. The differential pressure results because the combined static liquid fuel pressure acting on cup 27, and the fuel vapor pressure within the tank 10, will be exerted against the entire cross sectional area of the cup 27 to urge the latter into opening 25, but the equal opposing pressure will not be exerted on the cross sectional area of the portion of the seated spherical valve element 28 that is in communication with the substantially atmospheric pressure within vent conduit 16. The pressure in vent conduit 16 will never be greater than the pressure required to open check valve 21, and will rapidly reduce to atmospheric during equilibrium conditions by virtue of the bleed slot or orifice 21a.

It is apparent from the foregoing that a unique valve has been provided that is an effective vapor separator during normal operating conditions and is an effective roll-over valve operable in the event of certain emergencies. Although a simple float valve or gravity operated valve could be used as a vapor separator, neither of such valves could be used as a roll-over valve because the relative change in the direction of the gravity force in the event of a roll-over could cause the valve to float or fall away from the port to be closed.

I claim:

1. Means for preventing liquid fuel from discharging through a vapor vent conduit opening into an upper portion of an automobile fuel tank above the latter's normal fuel level comprising a hollow housing adapted to be supported in said upper portion, said housing having an upper closure portion and depending sidewalls and an unrestricted bottom opening for communicating with said tank, a vent port defined by a valve seat of said closure portion and extending through the latter for connecting said vent conduit with said tank, a hollow valve plunger freely movable within the hollow of said housing, said plunger having an upper closure portion and depending sidewalls and an unrestricted bottom opening aligned with said bottom opening of said housing for freely passing said fuel to and from the hollow interior of said plunger, means spacing said plunger from said housing to maintain said bottom openings substantially in alignment and also to provide a vapor passage between said plunger and housing normally in communication with said vent port, the closure portion of said plunger comprising an upwardly projecting valve element adapted to seat in fluid sealing relationship at said valve seat for closing communication between said tank and vent conduit upon predetermined movement of said plunger toward said valve seat, supporting means for normally supporting said plunger to maintain said valve element in proximate unseated relationship with said valve seat to enable vapor flow through said vent port from said vapor passage between said housing and plunger, and restricted port means for connecting said vapor passage with said upper portion of said tank, said plunger being floatable upwardly within said housing toward said vent port to close the same when a predetermined amount of vapor is trapped in the upper portion of said hollow plunger by fuel rising therein through its bottom opening and being otherwise non-floatable to move toward said vent port with the fuel flow into the latter bottom opening to close said vent port when said automobile fuel tank inclines to a predetermined angle.

2. In the combination according to claim 1, said restricted port means comprising a port in the lower portion of said housing, said housing and plunger having cooperating portions normally restricting communication between said vapor passage and said unrestricted bottom openings.

3. In the combination according to claim 2, second restricted port means in the upper portion of said housing for connecting said vapor passage with said upper portion of said tank.

4. In the combination according to claim 3, said supporting means and cooperating portions comprising a flange at the lower edge of the sidewall of said housing and underlying the sidewall of said hollow plunger to support the latter.

5. In the combination according to claim 4, the first named restricted port means comprising an opening through the sidewall of said housing immediately above said flange.

6. In the combination according to claim 1, said housing and plunger having cooperating portions restricting communication between said vapor passage and said unrestricted bottom openings when said plunger is supported by said supporting means, said restricted port means being located in said housing above said cooperating portions.

7. In the combination according to claim 6, said supporting means and cooperating portions comprising an inturned flange of said housing underlying a bottom annular sidewall edge of said plunger in supporting relationship, and said restricted port means comprising a port through the sidewall of said housing immediately above said flange.

8. In the combination with an automobile fuel tank having a vapor vent conduit opening into an upper portion of said tank above the normal fuel level, means for preventing liquid fuel from discharging through said vent conduit comprising a hollow housing supported in said upper portion, said housing having an upper closure portion and depending sidewalls and an unrestricted bottom opening in communication with said tank, a vent port defined by a circular valve seat of said closure portion and connecting said vent conduit with said tank, a hollow valve plunger freely movable within the hollow of said housing, said plunger having an upper closure portion and depending sidewalls and an unrestricted bottom opening aligned with said bottom opening of said housing for freely passing said fuel to and from the hollow interior of said plunger, means spacing the last named depending sidewalls from the sidewalls of said housing to maintain said bottom openings substantially in alignment and also to provide a vapor passage between said plunger and housing normally in communication with said vent port, the closure portion of said plunger comprising an upwardly projecting valve element having a spherical surface adapted to seat in fluid sealing relationship at said valve seat to close said vent port and prevent communication between said tank and vent conduit upon predetermined movement of said plunger toward said valve seat, supporting means for normally supporting said plunger to maintain said valve element proximate and in unseated relationship with said valve seat to enable vapor flow through said vent port from said vapor passage between said housing and plunger, said plunger and housing having cooperating portions normally restricting communication between said vapor passage and unrestricted bottom openings when said plunger is supported by said supporting means, and restricted port means connecting said vapor passage with said upper portion of said tank at all times regardless of the position of said plunger, said plunger being floatable upwardly within said housing toward said vent port to close the same when a predetermined amount of vapor is trapped in the upper portion of said hollow plunger by fuel rising therein through its bottom opening and being otherwise non-floatable to move toward said vent port with the fuel flow into the latter bottom opening to close said vent port when said automobile fuel tank inclines to a predetermined angle.

9. In the combination according to claim 8, said restricted port means being adjacent the lower portion of said housing, and second restricted port means in the upper portion of said housing for connecting said vapor passage with said upper portion of said tank.

10. In the combination according to claim 8, the sidewalls of said housing and plunger being cylindrical and adapted to extend vertically when said fuel tank is in its normal untilted condition.

11. In the combination according to claim 10, said supporting means and cooperating portions comprising a flange at the lower edge of the sidewall of said housing and underlying the sidewall of said hollow plunger to support the latter, the first named restricted port means comprising an opening through the sidewall of said housing immediately above said flange.

12. In the combination according to claim 11, said means spacing said closure portions and sidewalls comprising means projecting from one of said sidewalls toward the other and spaced closely from said other to maintain said plunger generally coaxially within said housing.

* * * * *